United States Patent
Dion et al.

(10) Patent No.: US 7,017,465 B2
(45) Date of Patent: Mar. 28, 2006

(54) CUTTING TOOL WITH GROOVED CUTTING EDGE

(75) Inventors: Paul Armand Dion, North Attleboro, MA (US); John Thomas Caron, Ararat, NC (US)

(73) Assignee: L.S. Starrett Company, Athol, MA (US)

( * ) Notice: Subject to any disclaimer, the term of this patent is extended or adjusted under 35 U.S.C. 154(b) by 0 days.

(21) Appl. No.: 10/207,415

(22) Filed: Jul. 29, 2002

(65) Prior Publication Data

US 2004/0016328 A1    Jan. 29, 2004

(51) Int. Cl.
  *B27B 33/02*    (2006.01)
(52) U.S. Cl. .......................................... 83/835; 83/837
(58) Field of Classification Search ................ 83/835, 83/836, 837, 838, 839, 840, 841, 842, 843, 83/844, 845, 846, 847, 848, 849, 850, 851, 83/852, 853, 854, 855; 76/112
  See application file for complete search history.

(56) References Cited

U.S. PATENT DOCUMENTS

| | | | |
|---|---|---|---|
| 1,434,047 A | | 10/1922 | DeBats |
| 2,706,328 A | | 4/1955 | Karmazin |
| 2,961,762 A | | 11/1960 | Clark et al. |
| RE25,434 E | * | 8/1963 | Christensen .............. 451/541 |
| 3,162,187 A | * | 12/1964 | Christensen ................ 76/112 |
| 3,315,548 A | | 4/1967 | Anderson et al. |
| 3,371,393 A | * | 3/1968 | Grassmann ................. 83/851 |
| 3,593,600 A | | 7/1971 | Adams, Jr. et al. |
| 3,616,982 A | | 11/1971 | Dion |
| 3,702,497 A | | 11/1972 | Dion |
| 3,707,617 A | | 12/1972 | Rutter et al. |
| 3,714,701 A | | 2/1973 | Dion et al. |
| 3,762,007 A | | 10/1973 | Dion et al. |
| 3,930,426 A | | 1/1976 | Berggren et al. |
| 4,068,976 A | * | 1/1978 | Friedline .................. 407/114 |
| 4,125,936 A | | 11/1978 | Rozmus |
| 4,187,754 A | * | 2/1980 | Beaty ....................... 83/847 |
| 4,232,096 A | * | 11/1980 | Franzen et al. ............ 428/683 |
| 4,409,296 A | | 10/1983 | Ward |
| 4,461,268 A | * | 7/1984 | Inoue ....................... 125/15 |
| 4,463,645 A | * | 8/1984 | Goellner ................... 83/852 |
| 4,484,959 A | | 11/1984 | Boucher et al. |
| 4,505,251 A | * | 3/1985 | Stoll ......................... 125/15 |
| 4,557,172 A | | 12/1985 | Yoneda |
| 4,599,771 A | | 7/1986 | Trenkler et al. |
| 4,722,125 A | | 2/1988 | Peng |
| 4,722,320 A | * | 2/1988 | Delk, III .................. 125/15 |
| 4,727,788 A | | 3/1988 | Yoshida et al. |
| 4,798,932 A | | 1/1989 | Dion et al. |
| 4,813,324 A | | 3/1989 | Yoshida et al. |
| 4,827,822 A | | 5/1989 | Yoshida et al. |
| 4,883,500 A | * | 11/1989 | Deakins et al. ............. 51/298 |
| 4,958,546 A | | 9/1990 | Yoshida et al. |
| 5,042,711 A | | 8/1991 | Iskenderian et al. |
| 5,091,264 A | * | 2/1992 | Daxelmueller et al. ..... 428/685 |
| 5,094,135 A | | 3/1992 | Nakahara et al. |

(Continued)

*Primary Examiner*—Stephen Choi
(74) *Attorney, Agent, or Firm*—Wilmer Cutler Pickering Hale and Dorr LLP

(57) ABSTRACT

A cutting tool includes a base made of metal having a plurality to cutting teeth along an edge of the base, wherein at least one cutting tooth has at least one notch in the cutting edge of the at least one cutting tooth. A tool is prepared by introducing a notch running longitudinally along the length of the tool in the cutting edge of the cutting teeth.

14 Claims, 7 Drawing Sheets

U.S. PATENT DOCUMENTS

| | | |
|---|---|---|
| 5,246,160 A | 9/1993 | Jonas |
| 5,417,777 A * | 5/1995 | Henderer ................. 30/335 |
| 5,429,016 A | 7/1995 | Rowlett |
| 5,615,727 A | 4/1997 | Ollman |
| 5,752,563 A | 5/1998 | Ollman |
| 5,855,157 A | 1/1999 | Okamura et al. |
| 5,863,358 A | 1/1999 | Krzysztalowicz |
| 5,901,630 A * | 5/1999 | Kataoka et al. ............. 83/835 |
| 6,058,923 A | 5/2000 | Arntz et al. |
| 6,158,324 A | 12/2000 | Kullmann et al. |
| 6,220,139 B1 * | 4/2001 | Kobayashi et al. ........... 83/835 |
| 6,244,152 B1 | 6/2001 | Di Nicolantonio |
| 6,293,020 B1 | 9/2001 | Julien |
| 6,298,762 B1 | 10/2001 | LaRue et al. |
| 6,439,094 B1 | 8/2002 | Yoneda et al. |
| 6,532,852 B1 | 3/2003 | Tsujimoto et al. |
| 6,598,509 B1 | 7/2003 | Cook et al. |
| 2002/0148340 A1 | 10/2002 | Tsujimoto |
| 2002/0184981 A1 | 12/2002 | Tsujimoto |

* cited by examiner

CUTTING TOOL WITH GROOVED CUTTING EDGE

BACKGROUND OF THE INVENTION

1. Field of the Invention

This invention relates cutting tools, and in particular, to saw blades having novel teeth geometries for improved cutting.

2. Description of Related Art

Toolmakers have long sought to improve the durability and functionality of tools by modifying their cutting edges. Early progress included work-hardening of metal and adding steel edges to iron implements. Progress continues to today with the development of new superhard materials. In general, the ideal cutting tool should combine abrasion-resistance (hardness) with shock-resistance (toughness). Since it is difficult to combine the properties mentioned above in a single material, saw blade nowadays usually comprise a relatively tough metal base with high bending fatigue strength and a cutting-edge band of a high-speed steel that is less tough but highly wear resistant. The cutting-edge band is of such a width that at least the tips of the cutting teeth of the saw band or blade, or even the cutting teeth as a whole, can be cut out from it.

In general, it is desired to improve the cutting life of a cutting surface and to improve the quality of the cut. For example, the cut surface can be rough or uneven in those instances where the cutting edge becomes dull or the shape and orientation of the cutting teeth are not optimal. Similarly, cutting chips can accumulate at the cutting surfaces, thereby clogging the cutting path and impeding subsequent cutting.

Improvements in cutting performance are continually sought.

SUMMARY OF THE INVENTION

The present invention provides a cutting with superior cutting and wear-resistant properties.

In one aspect of the present invention, a cutting tool includes a base made of metal having a plurality to cutting teeth along an edge of the base, wherein at least one cutting tooth has at least one notch in the cutting edge of the at least one cutting tooth.

In one or more embodiments, the base has a first thickness at a first edge and a tapered region on the opposing edge of the base extending into and through an interior portion of the cutting edge member of the cutting tool, and at least one edge member comprised of a second metal is located adjacent to and forms a metallurgical bond with a surface of the tapered edge region of the base.

In another aspect of the invention, a cutting tooth, for use on a cutting tool includes a cutting tooth having at least one notch in the tip of the tooth to provide more than two cutting angles.

In still another aspect of the present invention, a cutting tool is provided including a base made of metal and an edge member having a plurality to cutting teeth, said edge member joined to the base along an edge of the base. The cutting tooth is a composite including at least first and second metals, wherein the first metal is softer than the second metal, and the first softer metal is flanked by the second harder metal and a groove is introduced during use by preferential wearing of the first, softer metal.

In another aspect of the present invention, a method of making a cutting tool having a base and a plurality of cutting teeth along an edge of the base includes introducing a groove running longitudinally along the length of the tool in the cutting edge of the cutting teeth. The notch is is machined into the cutting edge, or the notch is formed during use by preferential As used here and throughout the specification, the term "about" refers to ±10% of the stated value.

BRIEF DESCRIPTION OF THE DRAWING

Various objects, features, and advantages of the present invention can be more fully appreciated with reference to the following detailed description of the invention when considered in connection with the following figures, in which like reference numerals identify like elements. The following drawings are for the purpose of illustration only and are not intended to be limiting of the invention, the scope of which is set forth in the claims that follow.

DETAILED DESCRIPTION OF THE INVENTION

Figure 1A:
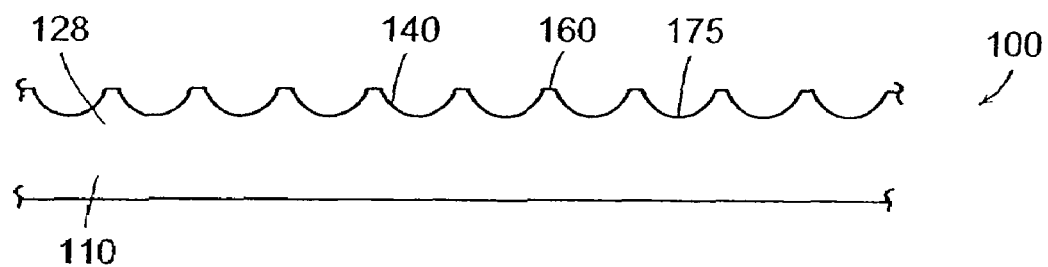
FIG. 1A is a side view.
Figure 1B:
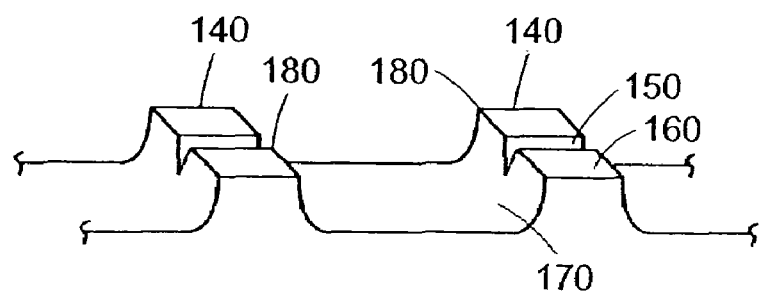
FIG. 1B is a fragmentary perspective view of a cutting tool according to one or more embodiments of the invention.

The present invention provides an improved cutting article having a novel cutting surface. Cutting tool 100 of the present invention is shown in side view in FIG. 1A. The cutting tool 100 includes a base 110 and an edge member 128 running along the length of the base 110. A finished product, e.g., a saw blade, includes cutting teeth 140 cut or machined in the edge member 128 of the cutting tool. FIG. 1B is a fragmentary perspective view of the cutting tool 100. Cutting teeth 140 include a notch or recess 150 in the cutting edge 160. The sloping or recessed region between cutting edges 160 is referred to as the gullet 170. (The cutting edge and the gullet may not be drawn to scale). A cutting tooth including a notch or indentation in the cutting edge increases the useful life of the tool, reduces shearing off of the cutting teeth and improves cutting performance. The lifetime of the tool is evaluated, in part, by determining the extent of tooth strippage over time.

The "cutting surface" of the cutting tool includes the entire surface that presents itself to and engages with the object to be cut and includes the gullet, cutting edge and the side surfaces. As used herein, "cutting edge" means the uppermost portion of the cutting surface that engages with the object to be cut and that contains the notch. A "cutting corner" is formed at the junction of the cutting edge, sloping gullet and the side (or notch) surfaces. The number and location of the cutting corners may play a role in the tool's cutting performance.

In one or more embodiments, the base 110 and the edge member 128 are integral, e.g., a single piece, and made from the same material. In other embodiments, the base and edge member are made from different materials, for example, the base is made from a first tough metal and the edge member is made from a second hard metal. In one or more embodiments, the base is a metal having desirable properties of mechanical and thermal stability, for example, under the conditions typically encountered in sawing or cutting operations. In general, the metal base can be any hot or cold rolled metal or metal alloy that is tough and spring-like. The metal base exhibits flexibility, and metals that exhibit flexibility, e.g., spring metals, can be used in the present invention.

In one or more embodiments of the invention, the second metal used as the cutting edge is harder or more wear-resistant than the first metal. The edge member is a wear-resistant metal; for example, the edge member is made from a metal capable of withstanding the abrasive conditions typically encountered by the cutting edge under sawing or cutting operations. The edge member metal can be one or more high speed steels, including powdered metals. By way of example only, high speed steels include Matrix II, M2, M42, M51, M3 Type 1, M3 Type 2, and the like.

The cutting tool includes at least one tooth having at least one notch or recess in the cutting edge; however, no other limitations are necessary. The cutting teeth can be of any conventional shape and geometry, as are dictated by the intended cutting application. The cutting teeth can be arranged in any way desired along the cutting surface. The cutting tool may include one or more notched teeth and/or may include a combination of notched and un-notched teeth. The teeth can be in or out of plane from the base, as is needed by a particular cutting application. In short, one is free to design the cutting tool as is most appropriate for a particular cutting application. Having determined the appropriate arrangement for the cutting teeth, the present invention improves the cutting edge by providing a notch or depression in the cutting edge.

All types of cutting tools are contemplated according to the present invention. The cutting tool of the present invention includes composite saws (bimetallic saws) and those fabricated from a single metal. The cutting tool of the present invention includes conventional welded bimetallic saws and composite metal saws prepared according to one or more embodiments of the present invention. In one or more embodiments of the present invention, the blade is a toothed blade, e.g., a saw blade such as hand and powered hacksaw, hole saw, jigsaw, reciprocating saw and band saw blades. By way of example only, a blade can be welded, e.g., butt-welded, to form a band saw blade.

Figure 2A:
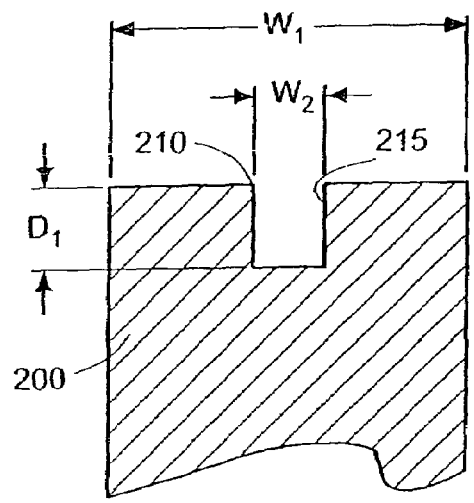
FIGS. 2A–2D are cross-sectional illustrations of various embodiments of the notch geometry used in cutting teeth of a cutting tool according to one or more embodiments of the present invention.
Figure 2B:
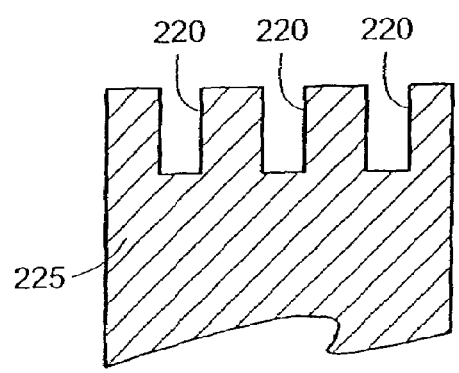
Figure 2C:
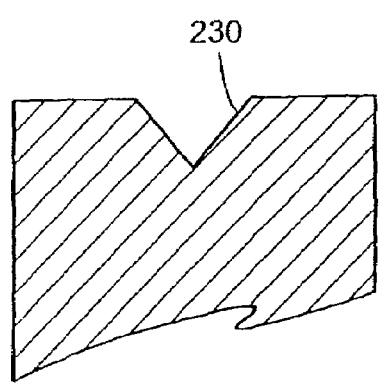
Figure 2D:
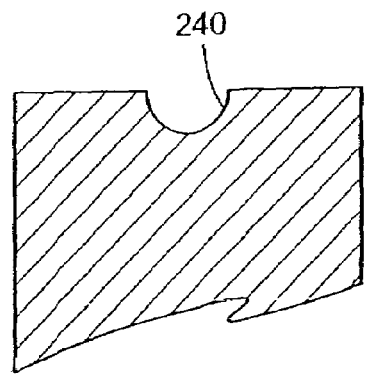

The notch is longitudinally oriented in the cutting edge of the tooth, that is, in the cutting direction. The notch of the cutting tooth can have a variety of geometries, as are shown in the non-limiting examples of FIGS. 2A–2D. FIG. 2A shows a cutting tooth 200 in cross-section having a square or rectangular slot 215. The notch is defined by the notch width $W_2$ and notch depth $D_1$. The notch is also defined relative to the total width $W_1$ of the cutting tooth. In one or more embodiments, the notch width is in the range of about 5–50% collectively of the total width of the cutting edge. In one or more embodiments, the notch width is in the range of about 0.005–0.020". The sharp angular sides of the notch provide additional cutting corners 210, e.g., there are now four cutting corners instead of two. The increase in the amount of cutting corners may play a role in the observed improvement in cutting performance. Two or more notches 220 can be used, as is shown for cutting tooth 225 in FIG. 2B. This embodiment significantly increases the number of cutting corners of the cutting surface. The notch can be a v-notch 230 or a rounded notch 240, as shown in FIGS. 2C and 2D, respectively.

In one or more embodiments, the cavity defined by the notch contains a soft metal, organic polymer or other shock absorbing material. By way of example, a soft metal such as solder or base metal or other shock absorbing material such as epoxy is introduced into the notch. The filler material can act to dampen harmonic vibrations that may occur during initial use, before the teeth are "broken in". Harmonic oscillations are particularly common in teeth having a high aspect ratio, i.e., a deep notch. In one or more embodiments, the damping material is selected to be a material that wears readily with a few operating cycles of the saw. It has been observed in some cutting tools, that the fill materials wear away slowly and in proportion with the wearing of the cutting edge. A particular feature of the filled-notch embodiment of the present invention is that the notch is shallow and thereby retains much of the structural stability of the un-notched tooth; however, the cutting action of the cutting tooth continually wears away or "renews" the notch as the cutting tool is used. Thus, improved cutting performance is observed throughout the entire cutting life of the tool.

The notch can be introduced into the cutting tooth using a variety of methods. For example, the notch can be machined into the cutting teeth of conventional cutting tools, such as single metal, powdered metal blade or a composite metal blade formed using conventional welding, e.g., electron beam welding, techniques. The notch is introduced into the cutting teeth of the blade using conventional tools such as a milling cutter, abrasive wheel, diamond saw, water jet, laser and the like. It will be appreciated that the different cutting techniques provide a range of cutting precision and notch characteristics. Thus, different cutting techniques are selected depending on the desired width and shape of the notch, among other characteristics.

Any cutting tool will benefit by the notched cutting teeth of the invention. In one or more embodiments, the cutting tool is a conventional single component saw blade, and the notch is introduced into the cutting edge using conventional methods.

Figure 3A:
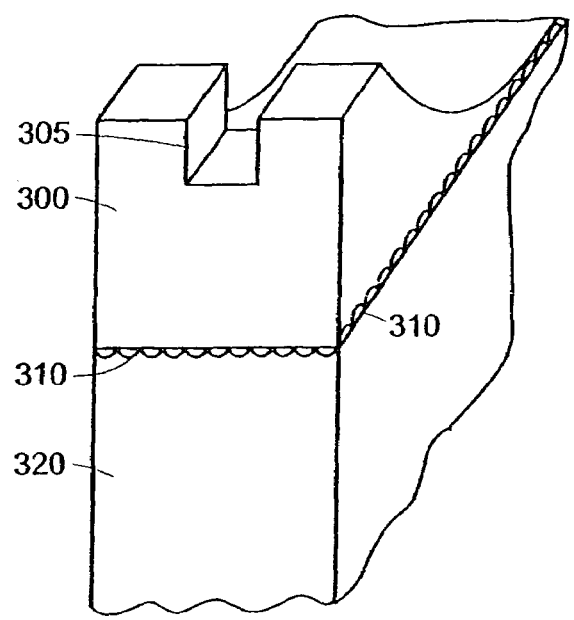
FIG. 3A is a cross-sectional view of a conventional welded article and 3B is a cross-sectional view of a bonded article having a notched cutting edge according to one or more embodiments of the present invention showing the shear line of the bond.

In one or more embodiments, the cutting is a composite cutting tool including a tough metal base and a harder metal cutting edge. Composite saw blades, that is, saw blades made up of two or more dissimilar materials, have been prepared by welding a thin strip of cutting tool steel to an edge of a flexible alloy steel backer. Common welding techniques are electron beam welding and laser welding. A conventionally welded cutting tooth 300 including the notch 305 of the present invention is shown in FIG. 3A. A shear line 310 indicates the point at which the edge is conventionally welded to base 320. The notch is introduced into the cutting tooth using conventional methods.

Figure 3B:
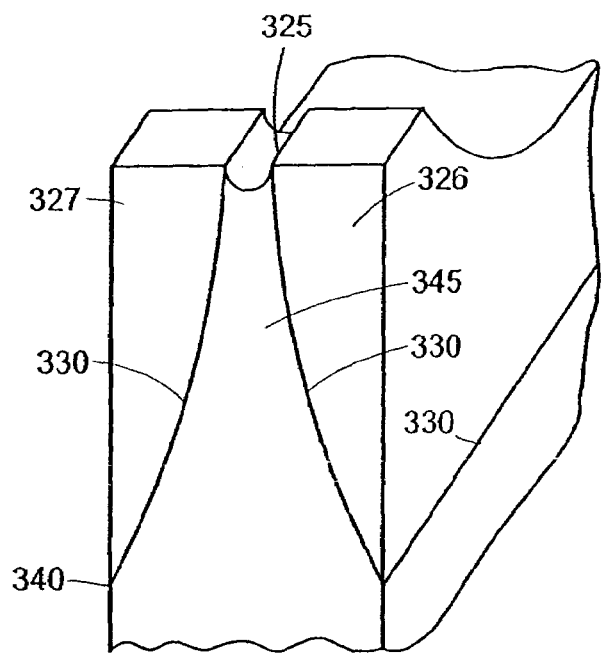

In one or more embodiments of the present invention, the composite metal cutting tools contain of cutting teeth formed from a combination of a hard cutting tool metal and a softer, supporting metal, which inherently provide a notched cutting tooth. The cutting edge presented to a surface to be cut includes alternating regions of hard cutting tool metal and softer metal. The soft metal can be provided in the form of a metal-filled notch in the harder cutting tool metal. FIG. 3B illustrates a composite metal cutting tool of one or more embodiments of the present invention. The base metal extends upwards from the base 340 and towards the cutting edge in an interior location of the cutting tool. The metal base forms an extended taper 345 that serves to define the recess 325 between two faces 326, 327 of the cutting tooth. Thus, according to one or more embodiments of the present invention, the notch is formed by positioning a softer material between two faces of a cutting tooth. Notch 325 may be introduced during use as the first few cutting cycles preferentially erode the softer metal (or other material) of the area. In one or more embodiments, a metallurgical bond 330 is formed between the base and cutting teeth of the composite cutting tool. The length (and related area) of the bond is greater for the cutting tool shown in FIG. 3B than for the that shown in FIG. 3A, thereby providing additional advantages, e.g., the composite cutting tool would be more durable, long lasting and more resistant to shear failure.

Figure 4:
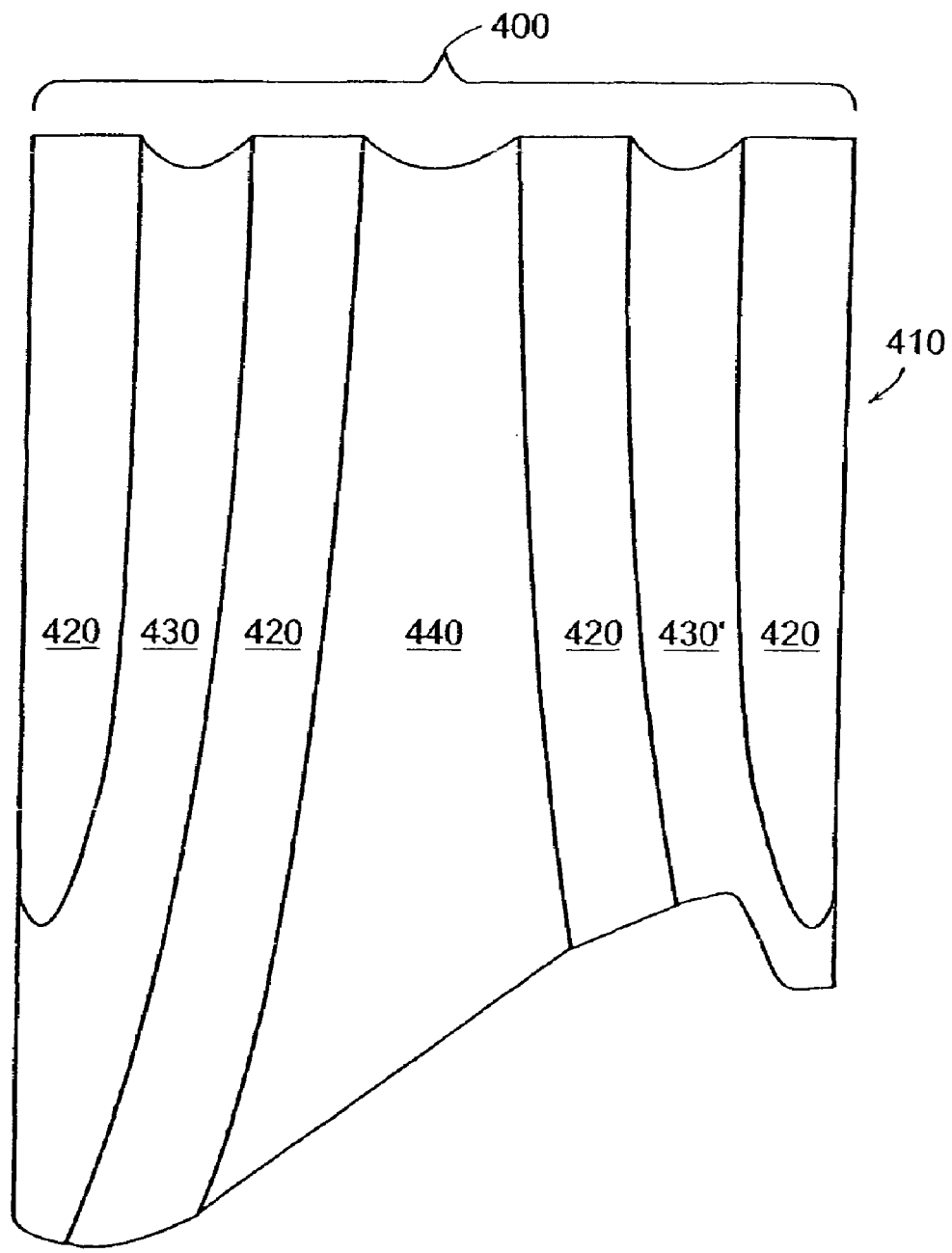
FIG. 4 is a cross-sectional illustration of one or more embodiments of the composite metal article of the invention in which the edge member has a plurality of alternating layers of hard cutting tool metal and a more flexible, supporting metal.

More complex composite cutting tools having notched cutting edges are contemplated in accordance with the present invention. In one or more embodiments of the invention, a cutting edge 400 of a composite cutting tool 410 as shown in FIG. 4 includes a plurality of alternating layers of hard cutting tool metal 420 and a more flexible, supporting metal 430. The innermost section 440 represents the thinned, tapered section of the metal base. The metal used for the flexible, supporting metal sections 430 can be the same as or different from the metal of the metal base 440. The metal components of the cutting edge are metallurgically bonded at shared surfaces. The thickness of the flexible, supporting metal sections 430 can be the same as or different from the thickness of the innermost section 440. For example, FIG. 4 illustrates a composite metal article having three sections 430, 440, 430' of flexible, supporting metal of varying thicknesses. The number, thickness and location of the different metal regions in the edge member are selected to provide a desired property in the article.

Figure 5:
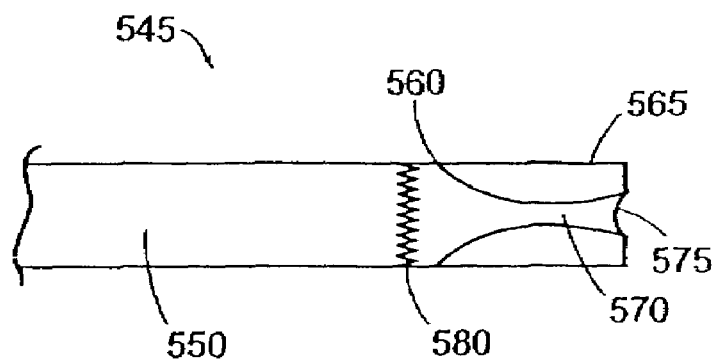
FIGS. 5 and 6 illustrate notched tooth cutting tools according to one or more embodiments of the present invention.

In one or more embodiments, the cutting tool is a hybrid article including a composite metal cutting strip that is welded, after fabrication, to a metal base. Cutting teeth are then cut into the composite metal cutting edge so that the alternating layers of cutting tool steel and soft metal provides the cutting edges and notches of the present invention. FIG. 5 shows a hybrid saw blade 545 using a conventional base 550. A composite metal cutting edge 560 includes a solid state bonded composite strip of alternating layers of hard cutting tool steel 565 and softer supporting metal 570. Notch 575 is formed in the soft supporting metal. The composite metal cutting edge is then attached at weld line 580 to the base using conventional welding techniques.

The cutting edge includes alternating regions or sections of hard and soft metal that have been solid state bonded to each other as shown in FIG. 3B, FIG. 4 and FIG. 5. In one or more embodiments, the material wears away only so far as to form a recess in the damping material (and thereby expose the new cutting edges of the cutting tool). During initial use, the soft metal regions wear away after only a few operating cycles of the blade and are recessed below the level of the hard cutting tool metal to form a shallow notch in the cutting surface. This provides additional advantages to the solid state bonded composite metal articles of the present invention, since the soft metal wears away as the cutting tool surface does so that the notch is continually being formed.

Figure 6:
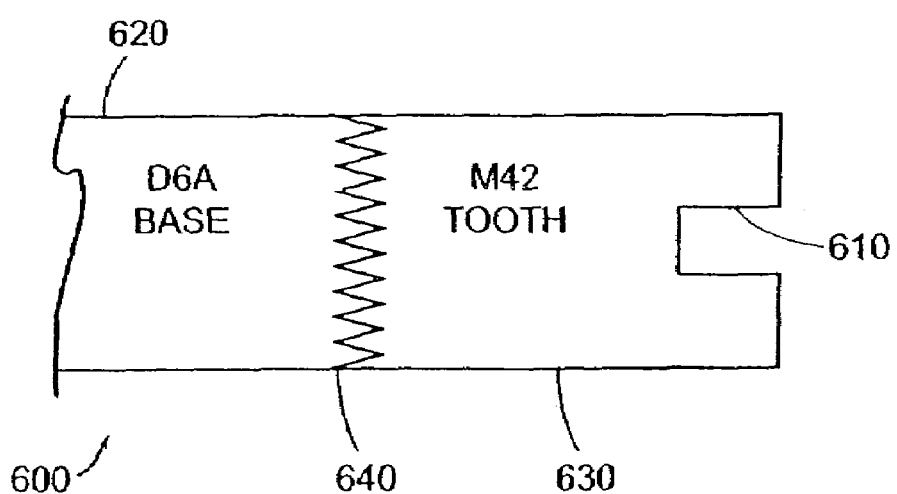

The cutting characteristics of a notched cutting tool having rectangular geometry such as shown in FIG. 6 were investigated. FIG. 6 shows a notched tooth cutting tool 600 prepared by mill cutting a 0.008" wide×0.010" deep rectangular notch 610 into a cutting tooth of a conventional composite saw blade. The base 620 of the saw blade (0.042" thick) was made from D6A; and a M42 cutting strip 630 (0.060" wide) was electron beam welded to an edge of the base. Electron beam weld 640 is denoted by a broad line to illustrate the wide heat-affected region of the weld. Cutting teeth (not observable in this view) were cut into the cutting strip and the notch was cut with a 0.006" wide milling cutter before the tooth was set (oriented at the predetermined cutting angle).

The tool was used under standard cutting conditions and the performance of the blade was compared to a comparable notch-less blade. The notched cutting tool demonstrated an extended cutting life compared to conventional notch-less blades. For example, the cutting life can be 25% or greater, even many-fold greater, depending upon the particular application. Improved cutting was observed in the notched blade until the cutting tooth wore down to the notch gullet base. Without a damping material, the saw blade vibrated noticeably during an initial breaking in period of the blade. Adding a damping material in the notch significantly reduced the vibration.

While not being bound by any theory or any particular mode of operation, it is hypothesized that the notch provides additional cutting surfaces (corners) for improved cutting by chip breaking. In addition, the notch reduces the chip size of the sawn material and provides and additional clearance area (in the notch) for its removal from the cutting surface. Small chips are easier to clear, and the more efficient removal of the chips reduces wear on the cutting tooth and improves cutting performance.

Figure 7A:
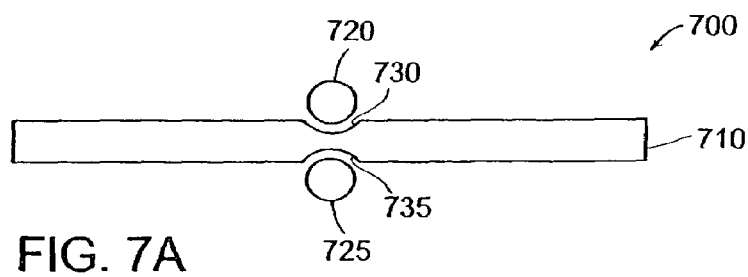
FIG. 7 illustrates the preparation of a composite metal cutting tool and shows an assembled composite of two dissimilar metals (A) prior to bonding, (B) after at least one consolidation step (arrows indicate applied pressure), (C) after additional consolidation steps, and (D) after slitting.

In one or more embodiments, the composite metal cutting tools of the present invention are prepared by heating an assembly of dissimilar metal components under pressure to form a bonded article, a process known as solid phase bonding. The composite assembly includes a metal base, such as a sheet or strip, having at least one depression or groove positioned longitudinally on one or both sides of the metal base that is capable of receiving an elongated metal element or wire. The wire can be of any shape, and is selected based upon any number of factors, including raw material availability, ease of manufacture, and the desire to complement the shape of the longitudinal depression of the metal base. An exemplary composite assembly 700 including a metal base 710 and elongated elements 720, 725 positioned in depressions 730, 735, respectively, of the metal base 710 is shown in cross-section in FIG. 7A.

The composite assembly is then heated under pressure to bring the metal base and the elongated elements into intimate contact and to form a metallurgical bond between the component metals. In one or more embodiments, the composite assembly is first heated to a temperature that is above room temperature and below the temperature of any metallurgical transformation ($T_m$) of any of the metals of the composite assembly and then passed through a pair of rolls (a "mill roll") to exert bonding pressure and to reduce the article thickness.

Figure 7B:
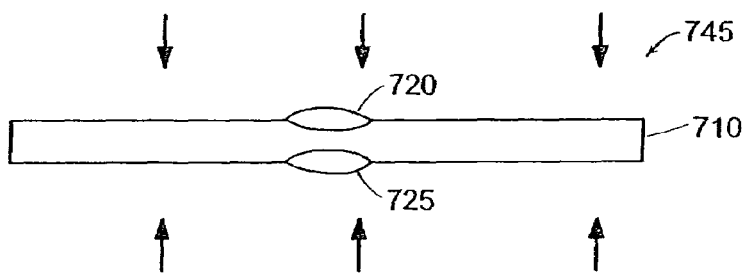

FIG. 7B is an illustration of the article 745 at an intermediate point during the heating and rolling process. The insert wires 720, 725 are pressed against and into the metal base. In one or more embodiments, the metal base is also being reduced in thickness. The greater the thickness reduction of the metal base (expressed as % reduction), the greater the forces experienced at the interface between the metal components. Thus, the wire size and shape and metal sheet thickness and groove size and shape relate to the bonding forces experienced by the composite assembly, and at the point where the insert wire(s) is introduced into the base groove, the large reduction forces favor stronger solid state bonding.

Although the actual temperatures used will vary depending upon the materials and pressing procedure used, temperatures can range from about 800 to about 1600° F., or in some embodiments from about 1000 to about 1550° F. Heating can be accomplished using any conventional method. By way of example, the composite assembly is heated using inductive or electrical resistance heating. In one or more embodiments, the heat is supplied by a form of radiation, for example, laser radiation.

Similarly, the actual pressures will vary greatly depending upon the materials and pressing procedure used. The pressure can be generated using any conventional method. By way of example, pressure is generated using a rolling mill or a turks head. Pressure is a function of many variables including, but not limited to, roll diameter, material deformation resistance (hardness), metal thickness, and the coefficient of friction between the roll and the metal being rolled, and the forces generated in rolling are well known in the industry. The addition of a hard insert wire, and in particular the addition of two wires stacked one on top of the other above and below the metal base, causes higher pressure at the point of contact—the specific location where high pressures are desired to improve bonding. The additional thickness locally due to the presence of the elongated element provides additional pressure for improved bonding during the solid phase bonding operation.

Figure 7C:
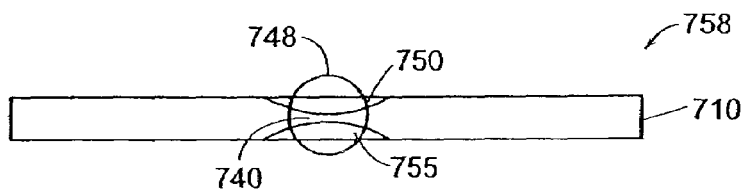

FIG. 7C illustrates a final bonded article 758, in which the pressure has forced the second metal of the wire insert into the metal base and the article surface is substantially flat. The contact area between the wire and the base has increased considerably during the bonding process due to thickness reduction and article elongation. Increased contact area provides a large bonding interface and contributes to the high quality of the bond. The metal base 710 has thinned considerably in a bonding area 748 so that only a thin strip 740 of the metal base is found between the upper and lower regions 750, 755 arising from the former insert wires.

Figure 7D:
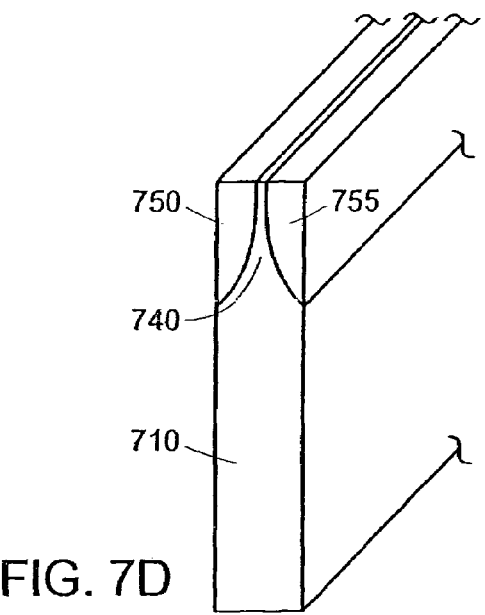

The final bonded article 758 is then slit in bonding area 748 to form the composite metal cutting tool of the invention. As shown in the perspective view in FIG. 7D, the metal base 710 includes a tapered section 740 that is in contact with edge members 750, 755 on opposing surfaces the thinned, tapered section 740. Edge members 750, 755 are tapered complementary to the taper of section 740, so that the article surface is flat. The taper may be linear or curved, or a more complex geometry resulting from material flow during fabrication. The edge members 750, 755 and the thinned, tapered section 740 of the base 710 form a strong, i.e., metallurgical, bond at the opposing surfaces.

Thus, in a few simple (and rapid) steps, the method of one or more embodiments of the invention provides a bonded article of a desired thickness. The starting materials can be thicker than those used in conventional electron beam welding processes, yet final thickness is achieved in fewer steps and less time, resulting in a significant savings in cost and materials.

Figure 8A:
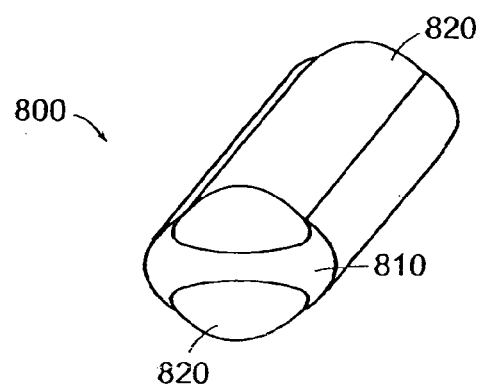
FIGS. 8A through 8C illustrate the preparation and use of a composite metal wire to prepare a cutting tool of one or more embodiments of the present invention.

For more complex cutting edges, such as that shown in FIG. 4, a composite metal wire, such as that shown in FIG. 8A, is used in the bonding method described above. Wire 800 includes a metal 810, for example one that is similar to or the same as the metal used for the metal base, and a dissimilar metal 820. Metal 820 is harder than metal 810 and is located at an outer surface so that the harder metal provides increased wear resistance to the composite. The component metals are arranged in alternating regions and the metal regions are bonded at their interfaces.

Figure 8B:
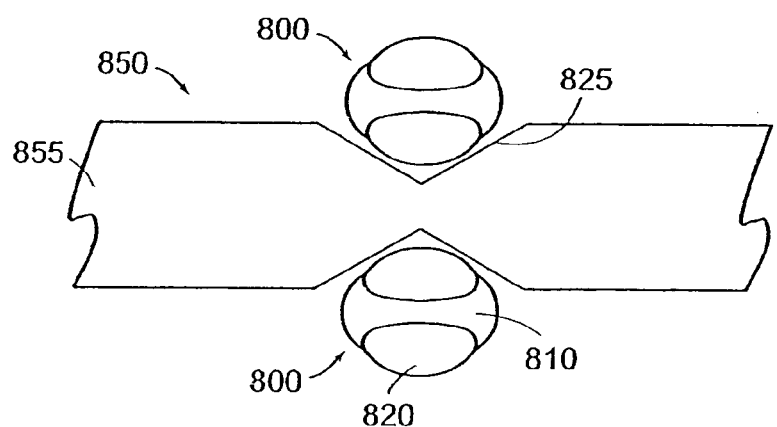

FIG. 8B illustrates a composite assembly 850 using the composite metal wire 800 and a metal base 855. It is desired that the composite wire is aligned in a plane of the metal base and remains so aligned during consolidation and bonding. The composite wire 800 nests or fits snugly into a groove 825 of the metal base 855. In one or more embodiments, the composite wire is of a shape, e.g., trapezoidal and the like, that discourages rotation of the composite wire within the groove. Once the component elements of the composite assembly are arranged, the assembly is heated under pressure to form the bonded article as described above.

Figure 8C:
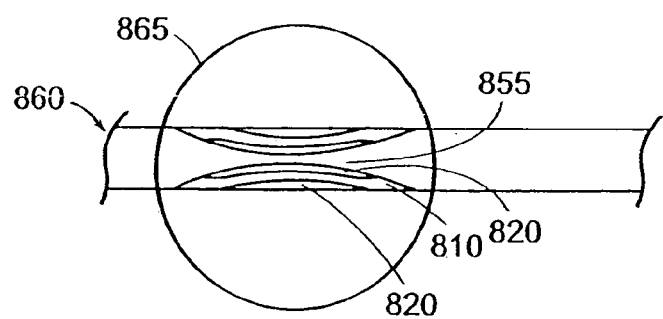

FIG. 8C illustrates the final composite metal article 860 after the heat and pressure treatment of the present invention. The bonded region 865 includes alternating layers of metals 810 and 820 disposed in a bonding region 865 of the metal base. The thus-obtained composite sheet is slit vertically through the central section of the bonding region 865 to reveal an edge of alternate layers of hard metal sections (820) and flexible supporting metal (810, 855). An exemplary resultant article is shown in FIG. 4.

For further detail on solid state bonding of composite articles, the interested reader is directed to United States patent application entitled "Composite Metal Article And Method Of Making" filed on even date herewith.

Although various embodiments that incorporate the teachings of the present invention have been shown and described in detail herein, those skilled in the art can readily devise many other varied embodiments that incorporate these teachings. All references mentioned herein are incorporated by reference.

What is claimed is:

1. A cutting tool, comprising:
a metal base having a plurality of machined cutting teeth along an edge of the base,
wherein at least one cutting tooth is a composite cutting tooth comprised of a first erodible metal member flanked on opposing sides by second harder metal members, the first metal member tapering from a first wider width at a lower portion of the cutting tooth to a second narrower width at a cutting edge of the cutting tooth, and
wherein the first erodible metal is selected to preferentially erode at the cutting edge during use.

2. The cutting tool of claim 1, wherein a groove is introduced into the cutting edge of the cutting tooth during use by preferential erosion.

3. The cutting tool of claim 2, wherein the groove occupies about 5–55% of the width of the cutting edge.

4. The cutting tool of claim 1, wherein said first wider width is substantially the same as the width of the base.

5. The cutting tool of claim 1, wherein the second metal members are tapered and have a taper complementary to the taper of the first erodible metal member.

6. The cutting tool of claim 1, wherein the taper is linear.

7. The cutting tool of claim 1, wherein the taper is curved.

8. The cutting tool of claim 1, wherein the first soft metal member is integral with and extending from the base.

9. The cutting tool of claim 1, wherein contains two or more erodible metal members.

10. The cutting tool of claim 1, wherein the second harder metal comprises a high speed steel.

11. The cutting tool of claim 1, wherein the cutting tool is selected from the group consisting of hand or powered hacksaw blades, band saw blades, reciprocating blades, jigsaw blades, and hole saw blades.

12. The cutting tool of claim 1, wherein the cutting teeth are welded onto the edge of the base.

13. The cutting tool of claim 12, wherein the cutting teeth are electron beam or laser welded to the edge of the base.

14. The cutting tool of claim 1, wherein a metallurgical bond joins the first erodible metal element and the second harder metal elements.

* * * * *

UNITED STATES PATENT AND TRADEMARK OFFICE
CERTIFICATE OF CORRECTION

| | | |
|---|---|---|
| PATENT NO. | : 7,017,465 B2 | Page 1 of 1 |
| APPLICATION NO. | : 10/207415 | |
| DATED | : March 28, 2006 | |
| INVENTOR(S) | : Paul A. Dion et al. | |

It is certified that error appears in the above-identified patent and that said Letters Patent is hereby corrected as shown below:

In the Claims:

In Claim 9, at column 9, line 3, after the word "wherein", insert -- the first erodible metal member--.

Signed and Sealed this

Fifth Day of December, 2006

JON W. DUDAS
*Director of the United States Patent and Trademark Office*